(No Model.)
E. GORDON.
DYNAMO AND MAGNETO ELECTRIC MACHINE.
No. 271,979. Patented Feb. 6, 1883.
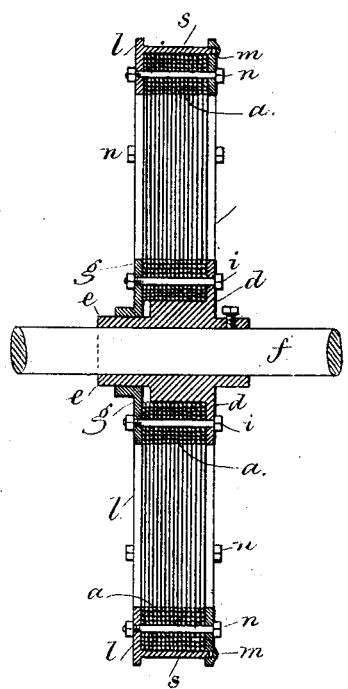
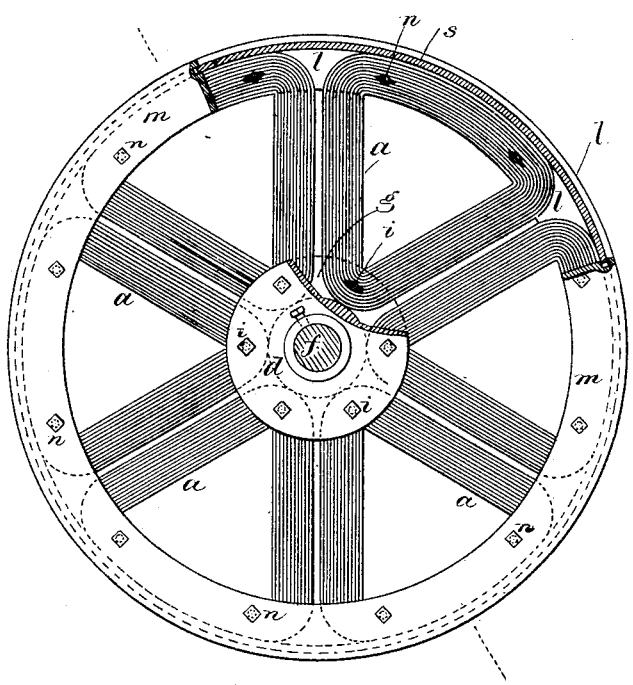

United States Patent Office.

EBENEZER GORDON, OF NEW YORK, N. Y.

DYNAMO AND MAGNETO ELECTRIC MACHINE.

SPECIFICATION forming part of Letters Patent No. 271,979, dated February 6, 1883.

Application filed October 31, 1882. (No model.)

*To all whom it may concern:*

Be it known that I, EBENEZER GORDON, of the city and State of New York, have invented an Improvement in Dynamo and Magneto Electric Machines, of which the following is a specification.

Before my invention the armature-wheel in dynamo and magneto electric machines had been made of wires or coils placed radially and clamped between two disks around the shaft, and between two rings at the sides of the outer portions of the coils or radial wires, as seen in Letters Patent No. 229,191, granted to Charles A. Seeley. In machines of this character it is important to make the armature-wheel complete in itself, so that it may not be disturbed or out of adjustment if the shaft has to be removed from the wheel, and also to secure the outer rings to the helices and to each other, so that they cannot become misplaced by the rapid revolution to which they are subjected.

My invention relates to the manner of constructing the clamping-rings and the disks of the hub so as to secure the coils and render the wheel more firm and reliable.

In the drawings, Figure 1 is an elevation of the armature-wheel, partially in section; and Fig. 2 is a vertical section of the same.

The coils $a$ of the armature-wheel are wound radially or in the form of sectors, as shown; but this feature is not my invention.

The electric or circuit connections to commutators are to be of any known character.

The disk or hub plate $d$ is formed with or permanently connected to the sleeve $e$, that is of a size to fit upon the main shaft $f$ of the machine, and the disk or hub plate $g$ has an opening in its center of a size to slip over the sleeve $e$; and hence when the disks $d$ $g$ are secured together and clamp the inner portions of the coils $a$ the sleeve $e$ keeps the parts in their proper relative position, whether the shaft $f$ is through the sleeve $e$ or not. The disks $d$ $g$ are secured together and to the coils by the bolts $i$, that pass through the disks and between the coils of wire.

The rings $l$ $m$ are at opposite sides of the outer portions of the armature-coils $a$, and they are bolted together by screws and nuts $n$, passing through the rings and between the wires, substantially as in Patent No. 229,191; but in order to retain the helices in place when wound with numerous wires in hanks or bunches the rings $l$ $m$ are necessarily at some distance apart. I make one ring, $l$, with a short cylindrical flange, $s$, and I cause the other ring, $m$, to enter within the edge of that flange or to interlock therewith by a deep circular groove receiving the edge of the flange $s$, so that the parts are firmly interlocked, and one ring cannot slip out of place in its relation to the other ring, and the coils or helices are clamped and held firmly within the rings of the armature-wheel.

I claim as my invention—

1. In combination with the coils in an armature-wheel and the shaft thereof, the clamping hub-disks $d$ $g$ and the sleeve $e$ upon the shaft, and around which the hub-disks are placed, substantially as set forth.

2. In an armature-wheel, the combination, with the helices or coils, of clamping-rings and an interlocking rim at the edge of one of the rings, substantially as set forth.

Signed by me this 20th day of October, A. D. 1882.

EBENEZER GORDON.

Witnesses:
 F. P. AMETRANO,
 B. MACGREGOR.